(12) United States Patent
McLinden et al.

(10) Patent No.: US 10,742,674 B1
(45) Date of Patent: Aug. 11, 2020

(54) SYSTEMS AND METHODS FOR SEGMENTED ATTACK PREVENTION IN INTERNET OF THINGS (IOT) NETWORKS

(71) Applicant: Architecture Technology Corporation, Eden Prairie, MN (US)

(72) Inventors: Ian McLinden, Eden Prairie, MN (US); Timothy Hartley, Eden Prairie, MN (US)

(73) Assignee: Architecture Technology Corporation, Eden Prairie, MN (US)

(*) Notice: Subject to any disclaimer, the term of this patent is extended or adjusted under 35 U.S.C. 154(b) by 237 days.

(21) Appl. No.: 15/940,853

(22) Filed: Mar. 29, 2018

(51) Int. Cl.
*H04L 29/06* (2006.01)
*H04L 12/46* (2006.01)

(52) U.S. Cl.
CPC ...... *H04L 63/1425* (2013.01); *H04L 63/0236* (2013.01); *H04L 63/101* (2013.01); *H04L 63/105* (2013.01); *H04L 63/1416* (2013.01); *H04L 63/1458* (2013.01); *H04L 12/4641* (2013.01)

(58) Field of Classification Search
CPC .......... H04L 63/1425; H04L 63/0236; H04L 63/101; H04L 63/105; H04L 63/1416; H04L 63/1458
See application file for complete search history.

(56) References Cited

U.S. PATENT DOCUMENTS

| | | | | |
|---|---|---|---|---|
| 8,893,278 | B1* | 11/2014 | Chechik | H04L 63/145 713/188 |
| 9,137,325 | B2* | 9/2015 | Muhunthan | H04L 63/1458 |
| 9,882,912 | B2* | 1/2018 | Joo | H04L 63/08 |
| 2012/0210017 | A1* | 8/2012 | Muhunthan | H04L 67/2819 709/238 |

(Continued)

OTHER PUBLICATIONS

Home Invasion 2.0, Attacking Network-Connected Embedded Devices, retrieved from the internet on Jun. 20, 2018, https://media.blackhat.com/us-13/US-13-Crowley-Home-Invasion-2-0-WP.pdf, 15 pages.
(Continued)

*Primary Examiner* — Shanto Abedin
(74) *Attorney, Agent, or Firm* — Foley & Lardner LLP

(57) ABSTRACT

Disclosed herein are embodiments of systems, methods, and products comprise a computing device, which allows in-network and network-border protection for Internet of things (IoT) devices by securely partitioning network space and defining service-based access to IoT devices. The disclosed segmented attack prevention system for IoT networks (SAPSIN) segments the IoT network into two virtual networks: a service network and a control network; and define access control rules for each virtual network. In the service network, SAPSIN utilizes a service-based approach to control device access, allowing only configured protocol, applications, network ports, or address groups to enter or exit the network. In control network, The SAPSIN provides the access control rules by defining a threshold for the number of configuration requests within a predetermined time. As a
(Continued)

result, SAPSIN protects IoT devices against intrusion and misuse, without the need for device-specific software or device-specific security hardening.

20 Claims, 4 Drawing Sheets

(56) References Cited

U.S. PATENT DOCUMENTS

| | | |
|---|---|---|
| 2016/0173495 A1* | 6/2016 | Joo .................. H04L 63/08 713/171 |
| 2016/0219024 A1* | 7/2016 | Verzun ................ H04L 9/34 |
| 2018/0129805 A1* | 5/2018 | Samuel ............ H04L 63/1425 |
| 2018/0159894 A1* | 6/2018 | Reddy ............. H04L 63/1458 |

OTHER PUBLICATIONS

Edwards et al., Hajime: Analysis of a decentralized internet worm for IoT devices, RapidityNetworks, Security Research Group, Oct. 16, 2016, pp. 1-18.

Ian McLinden, "Segmented Attack Prevention System for IoT Networks (SAPSIN)", Abstract-SBIR Phase 1 Proposal, DoD SBIR 2017.2, Proposal No. F172-D12-0184, Topic No. OSD172-D12.

Identification and Significance of the Problem or Opportunity, Architecture Technology Corporation, Proposal No. F172-D12-0184, Topic No. OSD172-D12.

* cited by examiner

US 10,742,674 B1

SYSTEMS AND METHODS FOR SEGMENTED ATTACK PREVENTION IN INTERNET OF THINGS (IOT) NETWORKS

TECHNICAL FIELD

This application relates generally to methods and systems for segmented attack prevention in Internet of things (IoT) networks.

BACKGROUND

Increase in the commercial availability of IP-enabled products, like Internet of Things (IoT) devices, has resulted in a wide proliferation of internet-connected micro-computing platforms, which has created a widespread and vulnerable attack surface for criminals and hackers. The IoT devices often act as consumer-friendly plug-and-play units, promising access to capabilities and services like in-home entertainment, home security, or nutrition monitoring. Consumers often trust the IoT devices with vital home security or personal safety functionality, such as the home monitoring capabilities offered by IP cameras. Manufacturers may commonly build the IoT devices around Linux® or Unix® kernels and run feature-limited versions of well-known operating systems. The combination of a standardized IP stack, processing power, and local storage may make the IoT devices as vulnerable to computer attacks as a desktop, mobile, or infrastructure computer. Hackers may exploit the networked capability to create large-scale attack platforms capable of launching powerful distributed denial of service (DDos) attacks against corporations or countries. Hackers may also exploit IoT devices to steal personal information or take control of IoT home devices.

Preventing misuse of these platforms is vital to ensuring internet security. Many manufactures have made attempts to protect the IoT devices from attack. In conventional methods, the source file examination and vulnerability analysis of current widespread exploits may have allowed some targeted protection against the known attacks. However, placing trust of personal or corporate security in the hands of IoT manufacturers, who have varying commercial and security backgrounds, may leave much to be desired as a comprehensive network protection solution. In addition, corporate-level IoT patching may potentially involve large scale support work of manually, possible even physically, updating devices. Such a solution may grow in complexity if a network is comprised of devices from many manufacturers, running differing and possibly proprietary operating systems. Additionally, network administrators or security professionals may need device-specific knowledge for each security upgrade, or skilled consultants, on a regular update basis.

An alternative conventional approach to securing a network of IoT devices may be to install infrastructure components like network firewalls, access control lists, or domain controllers. The network hardening approach may be feasible in corporations with existing network security infrastructure by adding aggressive access rules, or updating critical security components. However, such a solution may not scale back to protection of home networks. Nor may it provide a solution for mobile environments where IoT elements might exist, such as a battlefield. Additionally, installing enterprise-grade security components may necessitate enterprise-grade network security training and security-savvy administrators.

SUMMARY

What is therefore desired is to have a low-cost and secure means of hardening the IoT devices against intrusion, infection, attack or misuse to prevent misuse of the IoT devices by malicious groups. What is also desired is to have an attack prevention system for IoT networks that may be introduced to a preexisting IoT network with minimal network configuration, and protect devices from takeover or infection while additionally insuring that compromised devices would not later be used as a platform of attack.

Embodiments disclosed herein solve the aforementioned problems and other problems by creating partitioned network spaces for internet connectivity, IoT device access and IoT configuration. Discussed herein is segmented attack prevention system for IoT networks (SAPSIN) that may allow access to and configuration of IoT devices while protecting the devices from intrusion, monitoring the network for malicious activity, preventing potentially infected devices from becoming an additional attack surface, and increasing device availability.

In one embodiment, a computer implemented method comprises receiving, by a computer, a request associated with a device in an Internet of Things (IoT) network comprising a plurality of interconnected internet protocol (IP) enabled electronic devices; determining, by the computer, a type of the request based upon parsing a data packet of the request; upon determining by the computer that the request is a service request: querying, by the computer, a security database to retrieve a service data record associated with the device, wherein the service data record comprises one or more fields containing a communication protocol, an internet protocol (IP) address, and a port number; comparing, by the computer, one or more fields of the request with corresponding fields of the service data record; determining, by the computer, that the service request is a malicious request when the comparison between the one or more fields of the request and the corresponding fields of the service data records returns a mismatch; upon determining by the computer that the request is a configuration request: querying, by the computer, the security database to retrieve a threshold number of requests allowed within a predetermined time for the configuration request; querying, by the computer, a request database to retrieve the number of times the configuration request has been received by the computer within a time window according to the predetermined time; and determining, by the computer, that the configuration request is malicious when the query to the request database returns a number higher than the threshold number.

In another embodiment, a system comprises a non-transitory storage medium configured to store a security database and a request database; a processor coupled to the non-transitory storage medium and configured to: receive a request associated with a device in an Internet of Things (IoT) network comprising a plurality of interconnected internet protocol (IP) enabled electronic devices; determine a type of the request based upon parsing a data packet of the request; upon determining by the processor that the request is a service request: query the security database to retrieve a service data record associated with the device, wherein the service data record comprises one or more fields containing a communication protocol, an internet protocol (IP) address, and a port number; compare one or more fields of the request with corresponding fields of the service data record; determine that the service request is a malicious request when the comparison between the one or more fields of the request and the corresponding fields of the service data records returns a mismatch; upon determining by the processor that the request is a configuration request: query the security database to retrieve a threshold number of requests allowed within a predetermined time for the configuration request; query the request database to retrieve the number of times the configuration request has been received by the processor within a time window according to the predetermined time; and determine that the configuration request is malicious when the query to the request database returns a number higher than the threshold number.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate embodiments of the subject matter disclosed herein.

DETAILED DESCRIPTION

Figure 1:
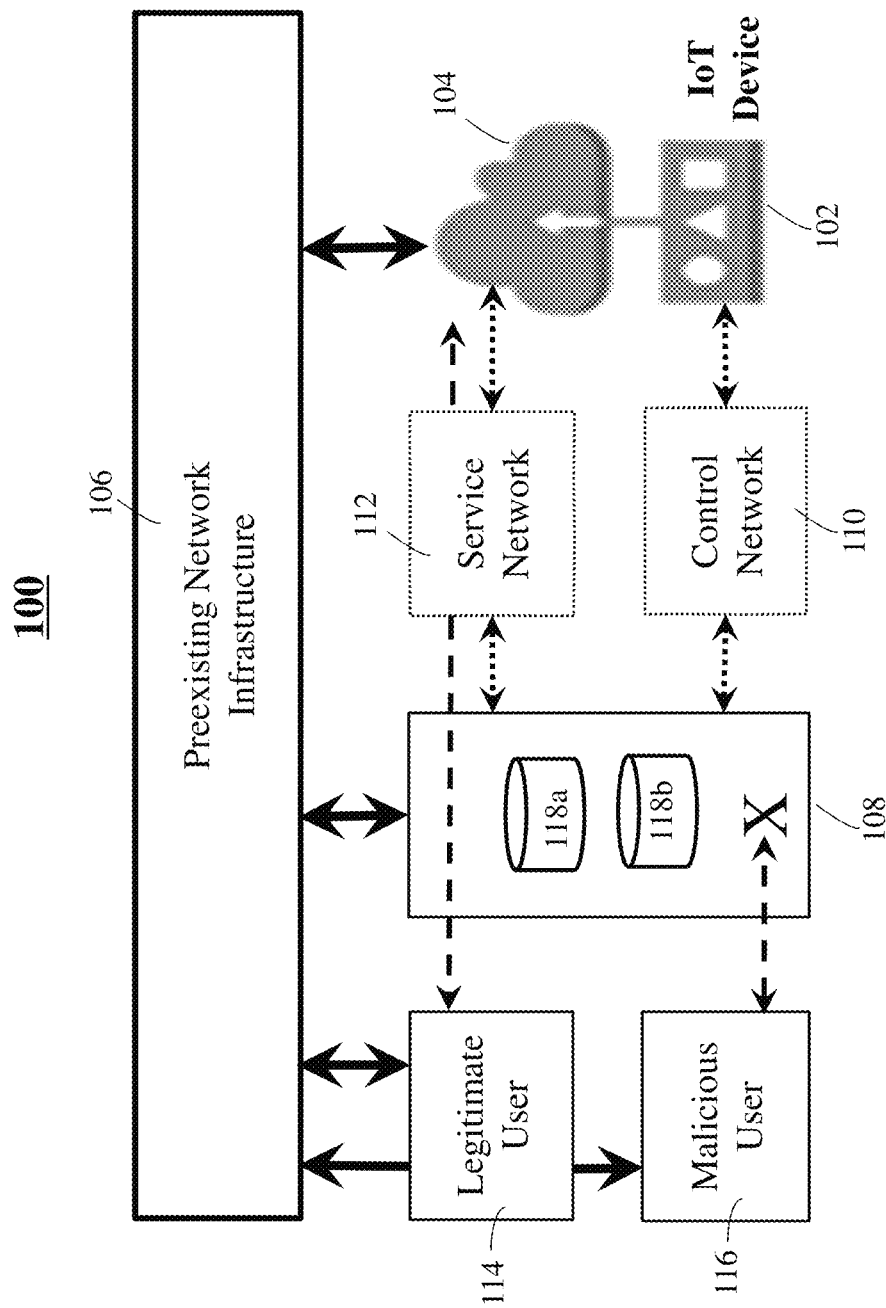
FIG. 1 illustrates a computer system for segmented attack prevention in IoT networks, according to an exemplary embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

FIG. 1 illustrates components of an exemplary system 100 for segmented attack prevention in Internet of Things (IoT) networks, according to an exemplary embodiment. The exemplary system 100 may include any number of computing devices. The exemplary embodiment may include a set of IoT devices 102. For example, the IoT devices 102 may include internet protocol (IP) enabled electronic devices such as smart sensors, cameras, smart thermostats, and any other type of smart devices. Each IoT device 102 may comprise a micro controller or a processor, a memory, and a storage medium. The IoT devices 102 may connect with other existing network infrastructure 106 via hardware and software components of one or more networks 104. A segmented attack prevention system for IoT networks (SAPSIN) 108 may provide protections for IoT devices 102 by segmenting the IoT network into two virtual networks: a service network 112 and a control network 110. The SAPSIN 108 may be software and hardware components at a computing device configured to offer protection for a broad range of internet enabled devices. The SAPSIN 108 may comprise a security database 118a and a request database 118b. The SAPSIN 108 may provide a virtual path for legitimate users with request packets compliant with the standard flow metrics. Examples of the standard flow metrics may include, but are not limited to, ingress interface, source IP address, destination IP address, IP protocol, source port for UDP or TCP, 0 for other protocols, destination port for UDP or TCP, type and code for internet control message protocol (ICMP), 0 for other protocols, IP type of service. For example, when a legitimate user 114 is attempting to access the IoT device 104 via a pre-approve protocol and port, from a legitimate address space, and with other metrics compliant with the standard flow metrics, the SAPSIN 108 may provide a virtual path for the user. The legitimate user may not be able to access the IoT device's control network 110 unless preauthorized as an administrator of the device. The malicious user 116 may attempt to access a control feature of IoT device (e.g., a remote shell). The SAPSIN 108 may not provide the malicious user 116 a virtual path to the IoT device because the malicious user is not a preauthorized administrator.

The IoT devices 102 may be any computing device of the IoT comprising a processor, memory, and power resources to perform various tasks, and network connectivity that enables the IoT device to connect and exchange data with other IoT devices. The IoT may connect objects in addition to mobile phones and other devices that are conventionally connected to a network, such as the Internet. For example, in a home network, the IoT devices 102 may be smart devices for lighting (e.g., lightbulbs), heating (such as smart thermostats), ventilation, air conditioning (HVAC), and security (e.g., sensors, cameras, alarms), medical devices, transportation (e.g., automobiles), as well as home appliances, such as washer/dryers, ovens or refrigerators/freezers. Such devices, when remotely monitored and controlled via the Internet, are an important constituent of the Internet of Things.

The SAPSIN 108 may be a software approach implemented on any hardware suitable for the intended deployment network. Two example hardware form factors may be a MIL-STD-810G embedded computer for protection of tactical sensors in the battlefield, or an embedded Linux® device for protection of IP-enabled office printers.

In one embodiment, the SAPSIN device 108 may be a device on-network, placed in a network space, like computers, end user devices (EUDs), IoT devices, etc. The SAPSIN 108 may provide network hardening and IoT protection with minimally invasive installation process, ideal for preexisting infrastructure such as a smart home or office space. The SAPSIN 108 may use a domain name system (DNS) based blackhole list technique to prevent potentially dangerous outbound traffic from reaching the wide area network (WAN) or Internet. An example in-network configuration of SAPSIN may be preventing an infected IoT device from launching a DDoS attack. The SAPSIN's blackhole may prevent infected IoT devices from resolving domain names known to be compromised, or in the service of malicious bodies. Even though SAPSIN should have prevented the initial infection and stopped the DDoS initiation commands from ever reaching the IoT device, the SAPSIN 108 may recognize the outbound traffic as malicious and drop the data packets before misuse can occur. Additionally, the SAPSIN 108 may mark the potentially compromised IoT device, alert administrators, and quarantine the device. Because SAPSIN is an on-network device, no IoT device hardening is necessary. For example, SAPSIN 108 may be introduced to a preexisting IoT network and with minimal network configuration, and transparently protect devices from takeover or infection, while additionally insuring that compromised devices would not later be used as a platform of attack.

In another embodiment, the SAPSIN device 108 may be a computing device at the network border, serving as a gateway between protected devices and unprotected wide area networks (WAN) or the Internet. The WAN may comprise an external internet connection, or unprotected wide area network. This embodiment may afford all the security of an in-network device while additionally providing a greater degree of protection, as the SAPSIN's 108 high assurance routing and networking segmentation may control all external access to protected IoT devices. In this embodiment, the on-border SAPSIN installation may ensure to drop the outbound malicious packets by acting as the network gateway. A SAPSIN device in network border configuration, when allocated a publically accessible IP address, may be able to provide network address translation (NAT) or dynamic domain name service (DDNS), and dynamic host configuration protocol (DHCP) for protected devices.

The SAPSIN 108 may use network segmentation to provide device security, prevent cross device infection, and disallow malicious device configuration. The SAPSIN 108 may divide the protected network space into three categories: WAN, control network 110, and service network 112. The SAPSIN 108 may strictly regulate the access to the IoT devices through the WAN to prevent external configuration or attack. First, the SAPSIN 108 may match the incoming or outbound traffic against the SAPSIN services and analyze traffic allowed through the services filtering for intent. The SAPSIN 108 may give traffic requesting data or service from an IoT device a virtual route through the service network 112. The SAPSIN 108 may route traffic requesting configuration or administration of an IoT device through the control network 110.

The service network 112 may be a first SAPSIN virtual network that protects the IoT devices. Traffic inbound to the service network 112 may have been verified to be a valid SAPSIN service, to a known IoT device. The service network 112 may maintain network state information such as traffic source and destination, flow, and bandwidth. The SAPSIN 108 may combine and analyze the metrics to provide security features such as distributed denial of service (DDoS) attack detection and address resolution protocol (ARP) scan detection. The service network 112 may not allow IoT device-to-device traffic, unless specifically configured by a device-to-device service. By preventing crosstalk between IoT devices, the SAPSIN 108 may ensure a potentially infected device does not gain access to, and subsequently infect, another network device. In the event of an infection, SAPSIN 108 may dynamically reallocate virtual addresses or quarantine infected devices, further preventing network compromise.

The control network 110 may be a second SAPSIN virtual network more strictly regulated than the service network 112. The control network 110 may allow only authenticated administrators to access IoT devices. To prevent accidental misuse, the SAPSIN 108 may not allow service definition between the control network 110 and the service network 112. Similarly, the SAPSIN protected IoT device may not be able to become a trusted administrator. To prevent device hijacking, the SAPSIN 108 may only allow one control connection at a time. However, SAPSIN 108 may use knowledge of the control network 110 topology to allow non-interfering administration of devices. In this way, multiple administrators may be able to configure independent IoT devices, while still protecting against infection scenarios.

The security database 118*a* may be any-transitory machine-readable media configured to store data. The security database 118*a* may include service data records of access control rules and/or security rules for different devices and different types of requests. For example, the security database 118*a* may include a table defining the access control rules of service requests for a protected IoT device. Specifically, the table may include a set of rules for the service requests by translating administratively defined services into rules of network metrics including the standard flow metrics. The table may include the fields of device identifier and the standard flow metrics, such as ingress interface, source IP address, destination IP address, IP protocol, source port for UDP or TCP, 0 for other protocols, destination port for UDP or TCP, type and code for internet control message protocol (ICMP), 0 for other protocols, IP type of service, and any other network metrics. When the SAPSIN 108 receives a service request trying to access data or service from the protected IoT device, the SAPSIN 108 may query the data record from the security database 118*a* based on the device identifier, and retrieve the service data record of the access control rules for the device. If the request satisfies all the rules defined in the security database 118*a*, the SAPSIN 108 may authorize the request.

The security database 118*a* may include another table defining access control rules for configuration requests. In some embodiments, the table may define the rules by determining a threshold number of requests allowed within a predetermined time based on the configuration type. For example, the threshold may be the number of allowed configuration request within a second. The threshold may depend on the complexity of the configuration. For simple configuration requests, the threshold may be a larger number; for more complicated configuration requests, the threshold may be a smaller number. The table may include the fields of configuration type and corresponding threshold. When the SAPSIN 108 receives a configuration request, the SAPSIN 108 may query the security database 118*a* to retrieve a threshold based on the configuration type.

In addition, the security database 118*a* may include another table for compromised devices. The SAPSIN 108 may store the identifiers of infected or potentially compromised devices into the table. As the result, when the SAPSIN 108 receives a new request, the SAPSIN may check if the request is from and/or to an infected device. The SAPSIN may quarantine the infected device by blocking any traffic from and/or to the infected devices to protect the IoT network. The table may include the infected device identifier such as the media access control (MAC) address, internet protocol (IP) address, domain name, and the like.

The request database 118*b* may be any-transitory machine-readable media configured to store data. The request database may include information of all the previously received requests. For example, the request database may include the fields of request identifier, request type, request source address, request destination address, request timestamp, request status (e.g., malicious or not), and any other necessary information.

Figure 2:
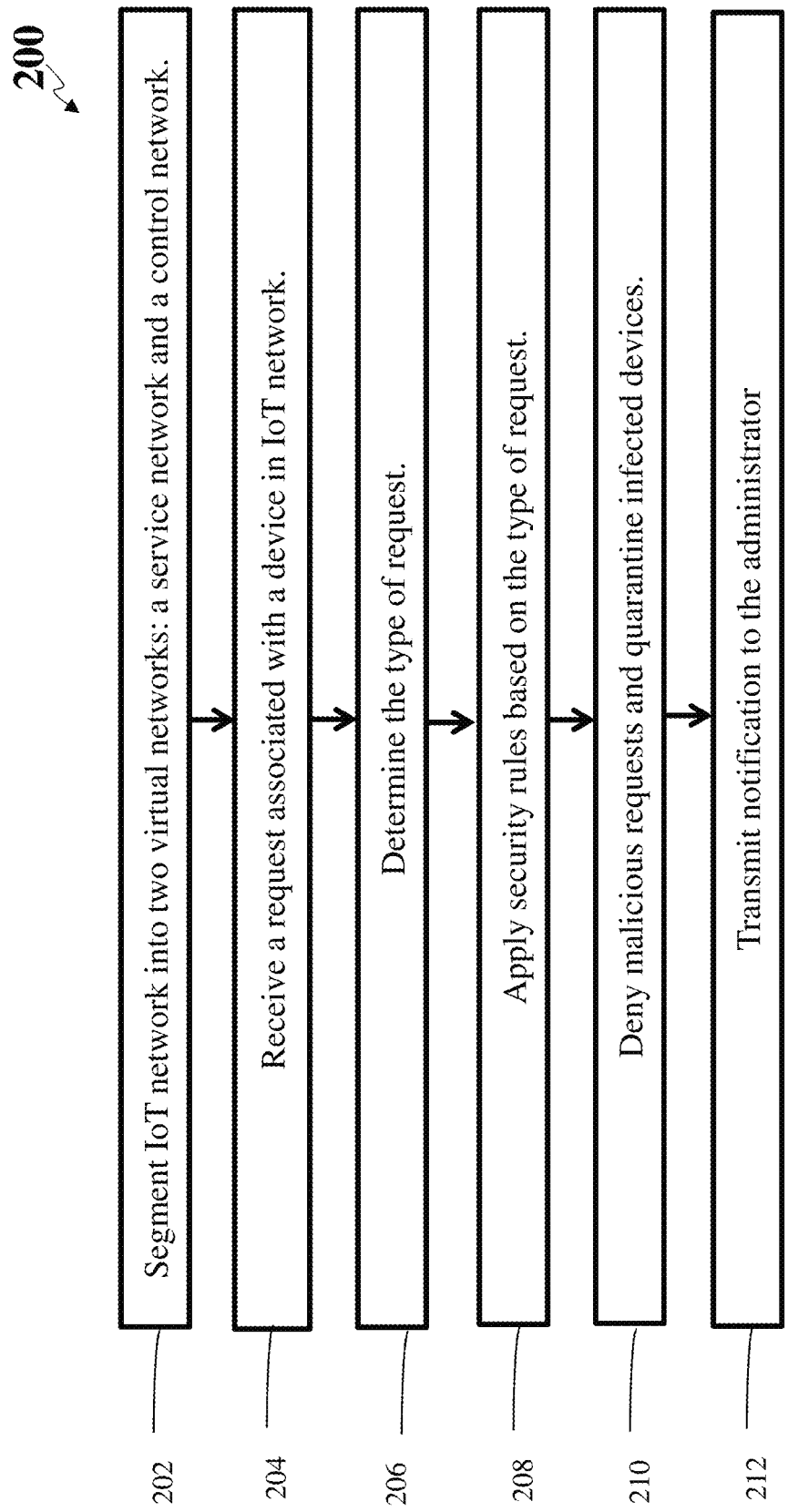
FIG. 2 illustrates a flowchart depicting operational steps for segmented attack prevention in IoT networks, according to an exemplary embodiment.

FIG. 2 illustrates a flowchart 200 depicting operational steps for segmented attack prevention in IoT networks, according to an exemplary embodiment. Other embodiments may comprise additional or alternative steps, or may omit some steps altogether.

At step 202, the SAPSIN may segment the IoT network into two virtual networks: a service network and a control network with the service network providing access control for service request data packets, and the control network providing access control for configuration request data packets. The SAPSIN may give a virtual route through the service network to traffic requesting data or services from an IoT device; the SPASM may give a virtual route through the control network to traffic requesting configuration or administration of an IoT device.

At step 204, the SAPSIN device may receive a request associated with a device in the IoT network. Because the IoT network may connect to public network, that has vast reach and accessible by anyone, the request may be malicious. For example, a hacker may try to break into the IoT network by gaining unauthorized access to the IoT network in a request. In some embodiments, the hacker may pose privacy threats by trying to steal personal, financial or business information from the IoT devices. For example, the hacker may request to access information such as personal identification numbers or details, bank or credit card numbers, and passwords. In some other embodiments, the hacker may pose security threats by requesting to change or damage data or configuration of one or more IoT devices. The hacker may make a request that seemingly innocuous, but insert hidden malicious software (malware) into the request. For example, the hacker may request an IoT device to download system update packets that may include computer viruses. The hacker may secretly install a malware on one IoT device in the IoT network, and use the infected device to send infectious data packets to infect other devices.

The malware may include a variety of forms of hostile or intrusive software, including computer viruses, worms, Trojan horses, ransomware, spyware, adware, scareware, and other malicious programs. It can take the form of executable code, scripts, active content, and other software.

At step 206, the SAPSIN device may determine the type of the request. Specifically, the SAPSIN may determine whether the request is a service request or a configuration request based on the intent and behavior of the request by parsing the request data packet. As discussed above, the malicious software from a hacker may have a variety of forms by acting against the interests of the IoT network users. To protect the IoT network, the SAPSIN device may category the request into two types: service request and configuration request based on the demands of the request.

For example, the SAPSIN device may determine the requests demanding for information (e.g., web pages, hyperlinks, documents, files, records, and the like) are service requests. Alternatively, the SAPSIN may determine the requests demanding for services/operations without changing the system initial configurations are service requests. Such requests may include opening a file, turning on a device, retrieving a database, and the like. On the other hand, the configuration request may include requests that affect and change system configuration, function and performance. For example, the SAPSIN device may determine the requests demanding a device to execute certain software, run certain executable codes, change system setup, and the like, are configuration requests.

At step 208, the SAPSIN device may apply security rules based on the type of the request. Each virtual network (e.g., service network and control network) may define a respective set of rules. Specifically, the SAPSIN device may determine access control rules for the service network by translating administratively defined services into rules for a micro-firewall, packet filtering rules, routing configuration, and access control lists. For example, the SAPSIN may provide a service-based model that defines the addresses, ports, protocols, applications, and similar network metrics for allowed connection to protected devices. The SAPSIN may store the access control rule in the security database. When the SAPSIN device receives a service request demanding service from an IoT device, the SAPSIN device may apply the defined rules by checking whether the request satisfies the network metrics of the rules. Specifically, the SAPSIN device may query the security database based on the IoT device identifier to retrieve a service data record associated with the device. The service data record may include access control rules defined for the IoT device. For example, each field of the service data record may include a rule on a specific network metric, such as a communication protocol, an internet protocol (IP) address, a port number, and any other network metrics from the standard flow metrics. The SAPSIN may compare one or more fields of the request containing the network metrics with the one or more fields of the service data record defining the rules. The SAPSIN device may determine that the service request is a malicious request when the comparison returns a mismatch. In other words, if any of the fields does not match, the SAPSIN device may determine the request is malicious. By defining the specific rules on a service request for protected IoT devices, the SAPSIN device may allow only authorized users to request the specific service from the IoT devices while denying unauthorized requests that do not satisfy the rules. As a result, the SAPSIN may achieve security protection.

The SAPSIN device may provide the access control rules for the control network by defining a threshold for the number of configuration requests within a predetermined time. A common attack for IoT networks may be attempting to establish remote sessions to one or more IoT devices and infect the IoT devices with malware. Such connections may be seemingly innocuous and look like a legitimate service that a normal firewall may not be able to filter out the connections. However, such connections may have a specific fingerprint in time-based features. For example, the attack may rapidly configure a device, faster than a human would be able to send configuration commands to the device. The SAPSIN device may determine a threshold based on the normal configuration operation of a human. For example, the threshold may define the maximum number of configuration requests allowed in the predetermined time. If the SAPSIN device identifies a connection that sends more configuration requests within the predetermined time than the threshold, the SAPSIN device may determine the requests are malicious and block the requests. For example, the SAPSIN device may query the security database to retrieve a threshold number of configuration requests allowed within the predetermined time. The SAPSIN device may also query the request database to retrieve the number of the configuration requests from the same user. For example, the SAPSIN may determine the source address of the configuration request by parsing the corresponding field of the request, and query all the configuration requests with the same source address from the request database. After obtaining all the configuration requests from the same users, the SAPSIN device may determine the number of the configuration requests within a time window according to the predetermined time based on the timestamp for each request. The SAPSIN device may compare the number of configuration requests within the time window with the threshold and determine the request is malicious if the number is larger than the threshold.

The SAPSIN device may store the received requests into the request database with related information of the requests, such as the request identifier, request type, request source address, request destination address, request timestamp, request status (e.g., malicious or not), and any other necessary information. The SAPSIN device may refer to the request database to determine if a new request is malicious or not.

The SAPSIN device may update and edit the access control rules dynamically. The editing may require no knowledge of firewall configuration or routing table manipulation. Thus, the SAPSIN device may provide network security protection with minimum configuration. Furthermore, SAPSIN device may allow filtering based on criteria in any open systems interconnection (OSI) model from layer 4 (e.g., transport layer) through layer 7 (e.g., application layer).

At step 210, the SAPSIN device may deny malicious requests and quarantine infected devices. For service request, the SAPSIN device may check whether the service request matches each network metric defined in the corresponding access control rules. If any of the network metrics does not match, the SAPSIN device may determine that the service request is malicious and deny the service request by dropping the request data packets.

For configuration request, the SAPSIN device may check whether the number of the configuration requests within the predetermined time satisfies the threshold defined in the security database. If the number does not satisfy the threshold, the SAPSIN device may determine the configuration request is malicious and deny the configuration request by dropping the request data packets as potentially infectious traffic.

Furthermore, the SAPSIN device may mark the previously configured device as potentially compromised and quarantine the potentially compromised device. For example, the SAPSIN device may update the table of compromised devices in the security database to include the potentially compromised device. The table may include identifiers of the compromised devices, including the media access control (MAC) address, internet protocol (IP) address, domain name, and the like. In one embodiment, the SAPSIN device may block requests from one of the compromised device. When the SAPSIN device receives a new request, the SAPSIN device may obtain the source MAC address of the request, and compare the source MAC address with the MAC address of the compromised devices in the security database. If there is a match, the SAPSIN may determine the request comes from a compromised device, and deny the request by dropping the request data packets. By blocking or dropping data traffic sent from the potentially compromised devices, the SAPSIN may ensure that compromised devices may not infect other devices as a platform of attack. In another embodiment, the SAPSIN may block requests addressed to one of the compromised devices. For example, a request may try to request some service from a device. The SAPSIN may compare the identifier of the device with the identifiers of the compromised devices. If the identifier of the device matches one of the identifiers of the compromised devices, the SAPSIN device may determine that the request is trying to access service from a compromised device. The SAPSIN may deny the request by not resolving domain name of the compromised device. As a result, the SAPSIN device may quarantine the potentially compromised device by blocking traffic both come from and sent to the compromised device.

At step 212, the SAPSIN device may transmit a notification to the administrator. The SAPSIN device may transmit the notification in the form of text message, instant message, email, voicemail, or any other electronic message. The notification may comprise the malicious request, the infected IoT device identifier associated with the request, the related security rules. With the notification information, the administrator may have an up to date network status, and be able to take proper actions based on the notification. For example, the administrator may examine the infected IoT device and mitigate the damage on the infected IoT device. In addition, the administrator may learn from the historical notifications on the malicious requests, derive new rules using artificial intelligent algorithms based on the historical notifications, and dynamically update the security rules in the security database with the new rules.

Figure 3:
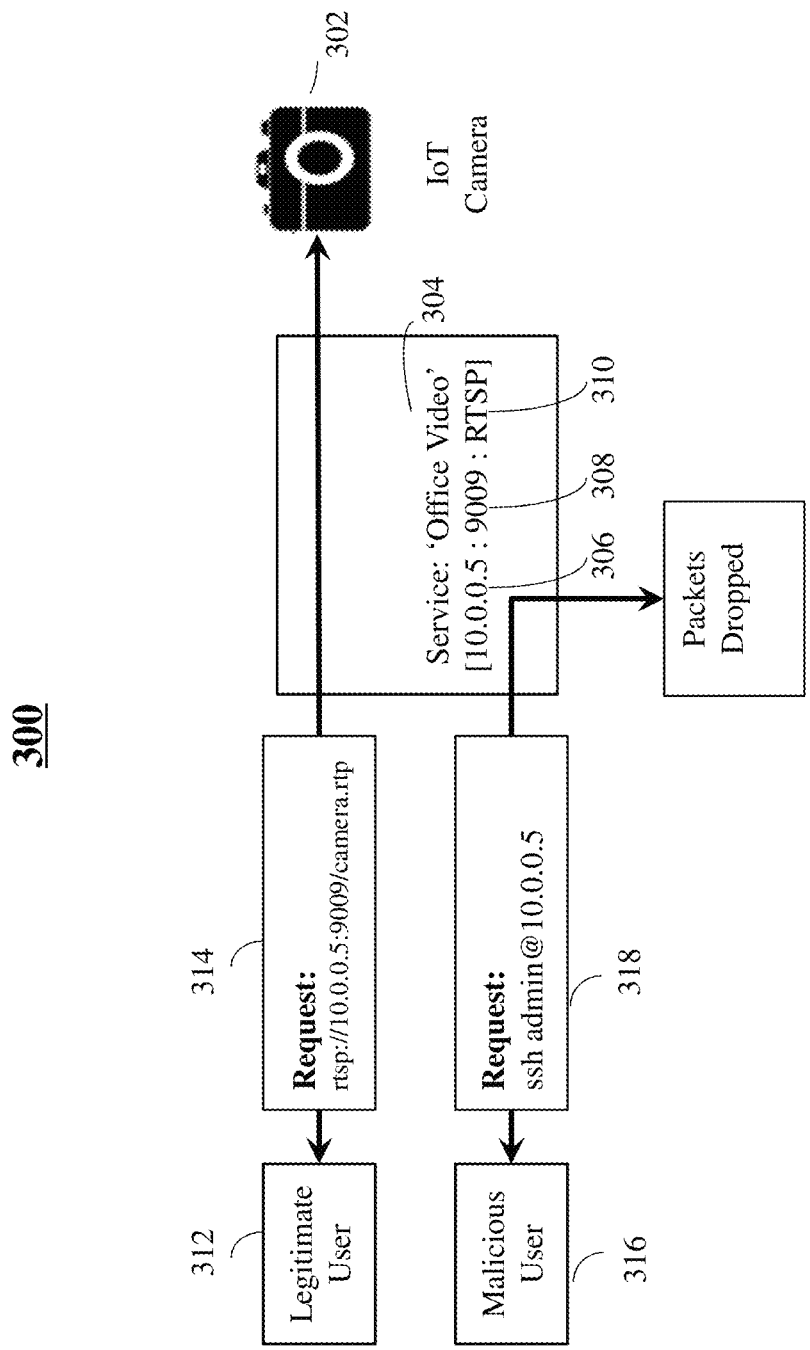
FIG. 3 illustrates an exemplary method for segmented attack prevention in service network of IoT networks, according to an exemplary embodiment.

FIG. 3 illustrates an exemplary method 300 for segmented attack prevention in service network of IoT networks, according to an exemplary embodiment. The SAPSIN may use a service-based access control system for device protection. Specifically, the SAPSIN may allow or disallow access to IoT device based on a combination of transport, session, presentation or application protocol; inbound or outbound IP address or IP range; port number; and similar network metrics. An administrator may define named service by utilizing combinations of the metrics. In this example, for a specific service associated with an IoT device, the SAPSIN may control the access based on network metrics that may include communication protocol, IP address, and port number. Specifically, the IoT device may be an IoT camera 302. The SAPSIN service may be a named service "Office Video" 304. The rules for accessing the office video may include specific communication protocol "RTSP" 310, IP address of "10.0.0.5" 306, on port "9009" 308. The SAPSIN may allow the access to the office video only when the request matches the rules. For example, the legitimate user 312 has a request 314 that matches the rules of required communication protocol (e.g., RTSP), IP address (e.g., 10.0.0.5), and port number (e.g., 9009). As a result, the legitimate user 312 may be able to access the video stream by using an approved service. A malicious user 316, however, may not be able to access the video stream because the request 318 from the malicious user does not match the required rules. For example, the malicious user may request a remote shell access to the IoT camera. In this example, the malicious request 318 does not have the required communication protocol "RTSP" and the required port number "9009," the request 318 is not allowable. Because the communication required to establish the shell session is not an allowable service, the SAPSIN may drop the request packets.

Figure 4:
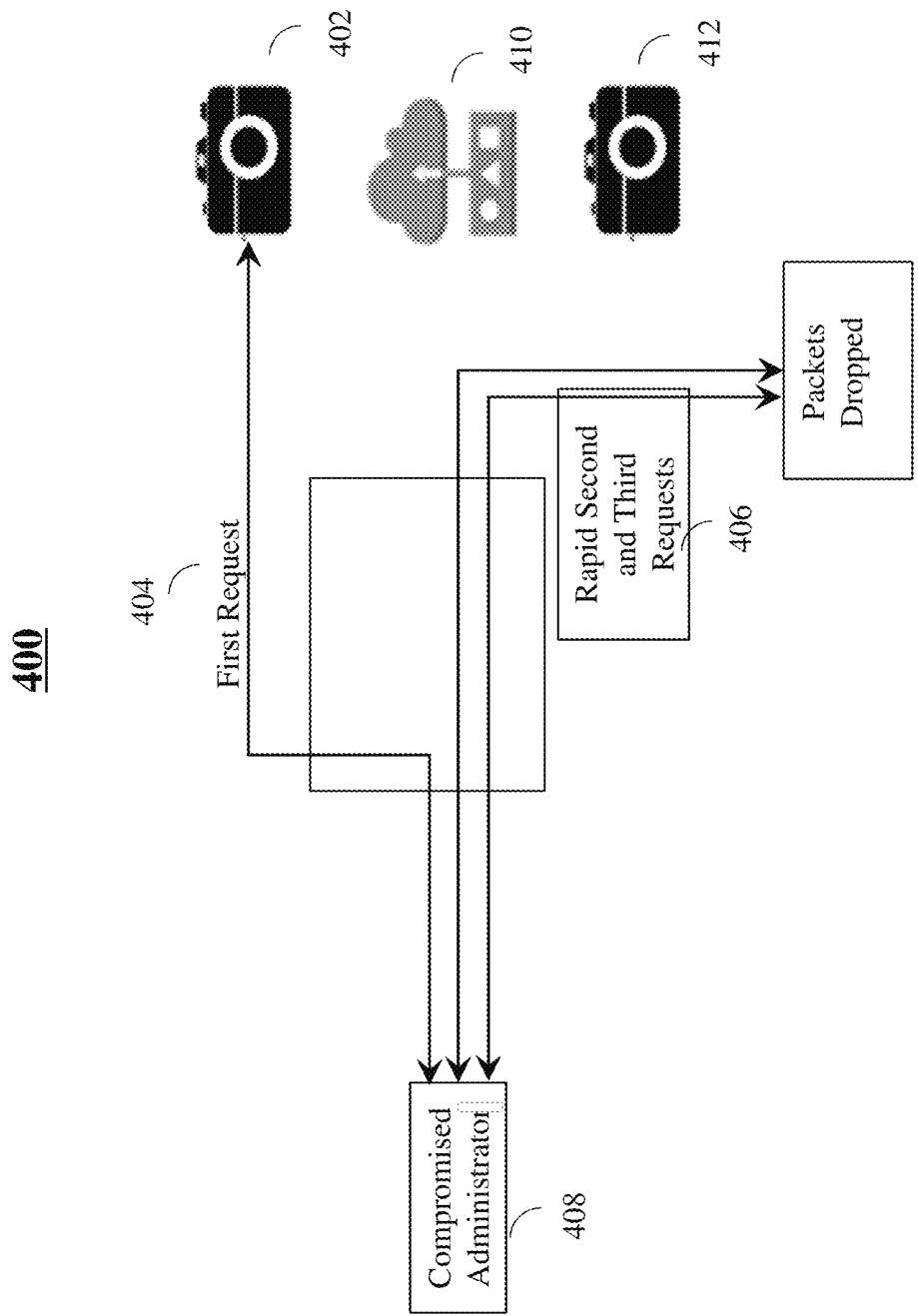
FIG. 4 illustrates an exemplary method for segmented attack prevention in control network of IoT networks, according to an exemplary embodiment.

FIG. 4 illustrates an exemplary method 400 for segmented attack prevention in control network of IoT networks, according to an exemplary embodiment. Attacks in the control network may have common time-based features. For example, the attacker may try to establish remote sessions to IoT devices and infect the devices with malware. Such connections may rapidly request configuration of the IoT devices within a certain period. The SAPSIN may utilize such feature to detect the malicious configuration requests. In some embodiments, the SAPSIN may define the threshold for the number of configuration requests within the period. For example, the SAPSIN may define the maximum legitimate configuration requests within each second is 10. When the number of requests is more than the threshold, the SAPSIN may determine the requests are malicious and drop the request packets.

In this example, the SAPSIN may allow the first request 404 to configure an IoT device 402 connected with the IoT network 410 as the first request 404 appears to be valid configuration traffic. If the potentially compromised administrator 408 then makes rapid requests 406 (e.g., requests in each second more than the threshold) to configure other IoT devices 412 connected with the IoT network 410, the SAPSIN may drop the potentially infectious traffic. In addition, the SAPSIN may maintain network state information for the control network by marking the potentially compromised IoT devices. The SAPSIN may mark the IoT camera 402 previously configured in the first request as suspicious. Therefore, the administrators may be aware of such information, and quarantine a potentially infected device to ensure that the compromised devices would not later act as a platform of attack.

The SAPSIN may provide critical IoT security infrastructure at a consumer-accessible price point, while offering protection packages that may be scaled to enterprise systems or tactical environments. The SAPSIN may not focus on IoT device hardening and can be installed with minimally invasive network configuration, enabling integration into many IoT network scenarios.

The SAPSIN routing may be software performed by a high-assurance micro Linux® system on a Chip (SOC). To prevent the SAPSIN device from exploitation and becoming an attack vector, SAPSIN may leverage previous experience with mission critical routing in selecting and designing a solution able to maintain separate virtual networks on one device. The SAPSIN routing core may allow logging and monitoring of network states without risk of unauthorized network boundary breaches. This high-assurance core may be software installed on any number of low-cost commercial off the shelf computer systems.

In addition to a secure routing core, the SAPSIN approach may provide additional security features to detect, prevent and recover from IoT network attacks. First, SAPSIN may integrate standard intrusion detection systems like Suricata® or Snort® to augment intrusion information gathered by the routing core. The SAPSIN may also integrate standard traffic monitoring suites and protocols such as NetFlow or sFlow, providing network administrators with an up to date network state or attack alerts. The NetFlow may be a feature introduced on routers that provides the ability to collect IP network traffic as it enters or exits an interface. By analyzing the data provided by NetFlow, a network administrator may determine things such as the source and destination of traffic, class of service, and the causes of congestion. The sFlow, short for "sampled flow", is an industry standard for packet export at Layer 2 of the OSI model, that may provide a means for exporting truncated packets, together with interface counters for the purpose of network monitoring.

The SAPSIN may also provide high-assurance remote configuration. Using commercial solutions for classified program (CSfC)-like encryption, two SAPSIN devices may establish a virtual control network that extended across an insecure WAN or Internet, and provide cryptographically secure configuration for remote administration. This capability may be of significant benefit for remote monitoring of classified IoT devices, such as recalibration of a mobile battlefield sensor array from a terrestrial command unit.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer implemented method comprising:
   receiving, by a computer, a request associated with a device in an Internet of Things (IoT) network comprising a plurality of interconnected internet protocol (IP) enabled electronic devices;
   determining, by the computer, a type of the request based upon parsing a data packet of the request;
   upon determining by the computer that the request is a service request for a service network of the IoT network:
   querying, by the computer, a security database to retrieve a service data record associated with the device, wherein the service data record comprises one or more fields containing a communication protocol, an internet protocol (IP) address, and a port number;
   comparing, by the computer, one or more fields of the request with corresponding fields of the service data record;
   determining, by the computer, that the service request is a malicious request when the comparison between the one or more fields of the request and the corresponding fields of the service data records returns a mismatch; and
   upon determining by the computer that the request is a configuration request for a control network of the IoT network:
   querying, by the computer, the security database to retrieve a threshold number of requests allowed within a predetermined time for the configuration request;
   querying, by the computer, a request database to retrieve the number of times the configuration request has been received by the computer within a time window according to the predetermined time; and
   determining, by the computer, that the configuration request is malicious when the query to the request database returns a number higher than the threshold number.

2. The method of claim 1, wherein the computer is a gateway device at network border between the IoT network and an unprotected wide area network.

3. The method of claim 1, wherein computer is a device within the IoT network.

4. The method of claim 3, further comprising:
   querying, by the computer, the security database to retrieve identifiers of compromised devices;
   comparing, by the computer, the identifier of the device with the identifiers of compromised devices; and
   blocking, by the computer, resolving domain name of the device when the identifier of the device matches one of the identifiers of compromised devices.

5. The method of claim 1, further comprising:
   determining, by the computer, the threshold number based on frequency of normal configuration operation of a human.

6. The method of claim 1, wherein the service request includes data packets requesting data and service from the device of the IoT network.

7. The method of claim 1, wherein the configuration request includes data packets requesting change of system configuration and function on the device.

8. The method of claim 1, further comprising:
   segmenting, by the computer, the IoT network into the service network and the control network, wherein the service network processes the service request, and the control network processes the configuration request.

9. The method of claim 1, further comprising:
   quarantining, by the computer, the device when the request associated with the device is determined to be malicious; and
   transmitting, by the computer, a notification to administrators of the IoT network indicating that the device is potentially infected.

10. The method of claim 1, further comprising:
    dropping, by the computer, the request when the request is determined to be malicious.

11. A system comprising:
    a non-transitory storage medium configured to store a security database and a request database;
    a processor coupled to the non-transitory storage medium and configured to:
    receive a request associated with a device in an Internet of Things (IoT) network comprising a plurality of interconnected internet protocol (IP) enabled electronic devices;
       determine a type of the request based upon parsing a data packet of the request;
       upon determining by the processor that the request is a service request for a service network of the IoT network:
       query the security database to retrieve a service data record associated with the device, wherein the service data record comprises one or more fields containing a communication protocol, an internet protocol (IP) address, and a port number;
       compare one or more fields of the request with corresponding fields of the service data record;
       determine that the service request is a malicious request when the comparison between the one or more fields of the request and the corresponding fields of the service data records returns a mismatch;

upon determining by the processor that the request is a configuration request for a control network of the IoT network:
- query the security database to retrieve a threshold number of requests allowed within a predetermined time for the configuration request;
- query the request database to retrieve the number of times the configuration request has been received by the processor within a time window according to the predetermined time; and
- determine that the configuration request is malicious when the query to the request database returns a number higher than the threshold number.

12. The system of claim 11, wherein the processor is included in a gateway device at network border between the IoT network and an unprotected wide area network.

13. The system of claim 11, wherein processor is included in a device within the IoT network.

14. The system of claim 13, wherein the processor is further configured to:
- query the security database to retrieve identifiers of compromised devices;
- compare the identifier of the device with the identifiers of compromised devices; and
- block resolving domain name of the device when the identifier of the device matches one of the identifiers of compromised devices.

15. The system of claim 11, wherein the processor is further configured to:
- determine the threshold number based on frequency of normal configuration operation of a human.

16. The system of claim 11, wherein the service request is data packets requesting data and service from the device of the IoT network.

17. The system of claim 11, wherein the configuration request is data packets requesting change of system configuration and function on the device.

18. The system of claim 11, wherein the processor is further configured to:
- segment the IoT network into the service network and the control network, wherein the service network processes the service request, and the control network processes the configuration request.

19. The system of claim 11, wherein the processor is further configured to:
- quarantine the device when the request associated with the device is determined to be malicious; and
- transmit a notification to administrators of the IoT network indicating that the device is potentially infected.

20. The system of claim 11, wherein the processor is further configured to:
- drop the request when the request is determined to be malicious.

* * * * *